(12) United States Patent
Suzuki et al.

(10) Patent No.: US 11,569,508 B2
(45) Date of Patent: Jan. 31, 2023

(54) BINDER RESIN FOR LITHIUM SECONDARY BATTERY ELECTRODE, ELECTRODE FOR LITHIUM SECONDARY BATTERY, AND LITHIUM SECONDARY BATTERY

(71) Applicants: PI R&D CO., LTD., Yokohama (JP); TOP MATERIAL CO., LTD., Icheon-si (KR)

(72) Inventors: Tetsuaki Suzuki, Yokohama (JP); Shuzo Waki, Yokohama (JP); Whan Jin Roh, Seoul (KR); Seung Joon Hong, Seoul (KR)

(73) Assignees: PI R&D CO., LTD., Yokohama (JP); TOP MATERIAL CO., LTD., Icheon-si (KR)

( * ) Notice: Subject to any disclaimer, the term of this patent is extended or adjusted under 35 U.S.C. 154(b) by 156 days.

(21) Appl. No.: 15/549,066

(22) PCT Filed: Feb. 1, 2016

(86) PCT No.: PCT/JP2016/052859
§ 371 (c)(1),
(2) Date: Aug. 4, 2017

(87) PCT Pub. No.: WO2016/125718
PCT Pub. Date: Aug. 11, 2016

(65) Prior Publication Data
US 2018/0034057 A1    Feb. 1, 2018

(30) Foreign Application Priority Data

Feb. 5, 2015 (JP) .............................. JP2015-021282

(51) Int. Cl.
*H01M 4/62* (2006.01)
*H01M 4/13* (2010.01)
(Continued)

(52) U.S. Cl.
CPC ......... *H01M 4/622* (2013.01); *H01M 4/0404* (2013.01); *H01M 4/0471* (2013.01);
(Continued)

(58) Field of Classification Search
CPC .. H01M 4/622; H01M 4/0404; H01M 4/0471; H01M 4/13; H01M 4/485; H01M 4/58; H01M 10/052; Y02T 10/7011
See application file for complete search history.

(56) References Cited

U.S. PATENT DOCUMENTS

2007/0009801 A1*  1/2007  Inagaki ............... C01G 23/005
                                                            429/231.95
2011/0111285 A1*  5/2011  Hirakawa ............. H01M 2/348
                                                            429/178
(Continued)

FOREIGN PATENT DOCUMENTS

JP    10-312791 A    11/1998
JP    11-97028 A     4/1999
(Continued)

OTHER PUBLICATIONS

Machine translation of JP 2013-004371, retrieved from <www.espacenet.com> on Apr. 2, 2021.*

(Continued)

*Primary Examiner* — Cynthia K Walls
(74) *Attorney, Agent, or Firm* — Birch, Stewart, Kolasch & Birch, LLP

(57) ABSTRACT

Provided are a binder resin for an electrode of a lithium secondary battery containing a solvent-soluble polyimide having a repeating unit represented by the following Formula [I], and a method of producing the binder resin for an electrode.

(Continued)

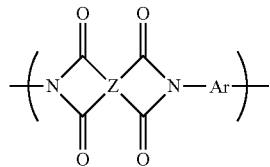

(In the formula, Z represents an aromatic or alicyclic tetracarboxylic dianhydride residue, and Ar is an aromatic diamine residue having a carboxyl group and an aromatic diamine residue having an aromatic ether bond, or an aromatic diamine residue having a phenylindan structure).

9 Claims, 2 Drawing Sheets

(51) Int. Cl.
| | |
|---|---|
| H01M 4/485 | (2010.01) |
| H01M 4/58 | (2010.01) |
| H01M 4/04 | (2006.01) |
| H01M 10/052 | (2010.01) |

(52) U.S. Cl.
CPC ............. *H01M 4/13* (2013.01); *H01M 4/485* (2013.01); *H01M 4/58* (2013.01); *H01M 10/052* (2013.01); *Y02T 10/70* (2013.01)

(56) References Cited

U.S. PATENT DOCUMENTS

| 2011/0189540 A1 | 8/2011 | Mori et al. |
| 2013/0184385 A1 | 7/2013 | Ogihara |

FOREIGN PATENT DOCUMENTS

| JP | 2011-216320 A | | 10/2011 | |
| JP | 2013-004371 | * | 1/2013 | ............. C08G 18/40 |
| JP | 2014-62255 A | | 4/2014 | |
| WO | WO 2009/142203 A1 | | 11/2009 | |
| WO | WO 2012/017738 A1 | | 2/2012 | |

OTHER PUBLICATIONS

International Search Report, issued in PCT/JP2016/052859, dated Apr. 5, 2016.
Written Opinion of the International Searching Authority (PCT/ISA/237), issued in PCT/JP2016/052859, dated Apr. 5, 2016.

* cited by examiner

BINDER RESIN FOR LITHIUM SECONDARY BATTERY ELECTRODE, ELECTRODE FOR LITHIUM SECONDARY BATTERY, AND LITHIUM SECONDARY BATTERY

TECHNICAL FIELD

The present invention relates to a binder resin for an electrode of a lithium secondary battery, an electrode for a lithium secondary battery manufactured using the same, and a lithium secondary battery.

BACKGROUND ART

Lithium secondary batteries are used as power supplies for electronic products such as mobile phones, smart phones, tablets, or notebook computers, and as a power source for electric vehicles and a large capacity battery constituting an energy storage system, demand for such lithium secondary batteries on the market is rapidly increasing. An electrode of a lithium secondary battery is manufactured by applying a slurry (mixture material) mixed with an active material, a conductive material, a binder resin, and a solvent on a current collector, drying the solvent, and then rolling the collector to a certain thickness, and in order to increase the energy density and the output density, an active material having high specific capacity and output characteristics is needed to be used.

For example, as a positive electrode active material of a lithium secondary battery, lithium transition metal oxide, lithium iron phosphate, or the like is used. Although graphite powder has been mainly used as a negative electrode active material, a non-carbon high capacity material such as silicon, lithium titanium oxide, or the like is increasingly used, and a material which is alloyed with lithium is also used to further increase the energy density of a battery.

Binder resins used for manufacturing electrodes are demanded to have battery characteristics such as adhesive strength to active material, conductive material, and current collector, active material coverage, resistance to electrolyte dissolution, efficiency, lifetime, and safety, and in addition, electrodes are demanded to be easily manufactured using such binder resins. Currently, as a positive electrode binder resin, PVDF (polyvinylidene fluoride) is used, and as a negative electrode binder resin, a combined system of SBR (styrene butadiene latex) and CMC (carboxymethyl cellulose) or PVDF is usually used. However, in view of adhesive strength, oxidation deterioration, safety, or the like, the use of these binder resins may be restricted in some cases.

In particular, in cases in which an active material or the like containing silicon (silicon) is used as a material to be alloyed with lithium, since the volume change of such an active material when inserting and extracting lithium is large, when a conventional binder resin such as PVDF is used, the active material is pulverized during charging and discharging, or the active material is separated from a current collector, and as a result, the current collecting property of a negative electrode is lowered and the charge and discharge cycle characteristics are deteriorated, which has been problematic.

In order to solve such a problem, polyimide resin having excellent heat resistance or adhesive strength has been studied as a binder resin used for manufacturing electrodes.

For example, Patent Document 1 discloses a method in which a slurry (mixture material) prepared by mixing a polyamic acid (precursor of polyimide) produced by reaction of aromatic diamine and aromatic carboxylic acid dianhydride in NMP solvent and graphite powder which is an active material is coated on a current collector and dried and then heat treated at 350° C. for 2 hours to convert the polyamic acid into polyimide on a current collector to prepare a negative electrode.

Patent Document 2 discloses a method in which a slurry (mixture material) prepared by mixing an aliphatic or alicyclic polyamic acid (precursor of polyimide) produced by reaction of diamine and carboxylic acid dianhydride in NMP solvent and an active material is coated on a current collector and dried and then heat treated at 250° C. for 1 hours to convert the polyamic acid into polyimide on a current collector to prepare a negative electrode.

Patent Documents 3 to 6 disclose a method of coating a current collector with a slurry containing an active material containing silicon and/or a silicon alloy and, as a binder, a polyimide precursor such as a polyamic acid, then heat treating at a high temperature, converting the polyimide precursor on the current collector to a specific polyimide compound to prepare a negative electrode.

For example, Patent Document 5 discloses a method of applying a slurry containing a binder precursor solution composed of a mixture of 3,3',4,4'-benzophenonetetracarboxylic acid diethyl ester, m-phenylenediamine and the like and an active material to a current collector, drying a solvent, and heat treating at a high temperature to prepare a negative electrode in which the binder precursor is made into a polyimide resin having a specific structure on the current collector.

However, in any of the methods in Patent Documents 1 to 6, the adhesion between a binder resin and an active material, a current collector or a conductive material or the cycle characteristics of a battery are still insufficient, and any of the methods include a step of heat-treating a polyimide precursor such as a polyamic acid at a high temperature, and therefore, the active material or the current collector may be oxidized in the heat treatment step, which may lower the charge/discharge efficiency of the battery.

Patent Document 8 discloses a method of coating a current collector with a mixture material including a precursor of a siloxane-containing polyimide resin and a negative electrode active material on a current collector and then imidizing the polyimide precursor on the current collector by heat treatment to prepare a negative electrode, and Patent Document 9 describes a conductive agent for an electrode of a battery containing a reaction product of π-conjugated carbon material and a soluble polyimide as a main component. However, even the electrodes obtained by the methods of Patent Documents 8 and 9 were insufficient to satisfy properties demanded for an electrode for the above-described lithium secondary battery.

RELATED ART DOCUMENTS

Patent Documents

Patent Document 1 U.S. Pat. No. 5,468,571
Patent Document 2 U.S. Pat. No. 7,972,725
Patent Document 3 WO2004/004031
Patent Document 4 JP 2007-242405 A
Patent Document 5 JP 2008-34352 A
Patent Document 6 WO2012/073853
Patent Document 7 JP H05-179224 A
Patent Document 8 JP 2010-238562 A
Patent Document 9 WO2009/142203

SUMMARY OF THE INVENTION

Problems to be Solved by the Invention

The present invention has been made in view of the above circumstances, and an object thereof is to provide a binder resin for an electrode capable of improving the adhesive strength between an active material, a conductive material, and a current collector which can suppress collapse of the binder at the time of charge/discharge or occurrence of separation at the interface between the active material and the current collector and the binder resin even when a negative electrode active material containing silicon (silicon) is used and is excellent in electrode manufacturability, rapid charge/discharge characteristics of lithium secondary batteries, charge/discharge cycle characteristics, active material coverage, charge/discharge efficiency and safety.

Another object of the present invention is to provide an electrode for a lithium secondary battery composed of a mixture material containing the binder resin applied on a current collector, a method of producing the electrode, and a lithium secondary battery comprising the electrode.

Means for Solving the Problems

The present inventors have conducted intensive studies to find that, when a carboxyl group or a phenylindan structure is introduced into a polyimide resin to be used as a binder resin for an electrode of a lithium secondary battery, the adhesive strength between an active material, a conductive material, and a current collector is remarkably improved. The present inventors also found that in the case of polyimide incorporating a phenylindan structure, even when a material containing silicon (silicon) is used as a negative electrode active material, occurrence of collapse of the binder resin and peeling at the interface between an active material and a current collector and a binder resin is suppressed, and a variety of characteristics of a battery can sufficiently follow the volume change of the active material.

On the other hand, in the case of polyimide in which only a carbonyl group is introduced, a variety of characteristics of a battery do not sufficiently follow the volume change of the active material. However, it has been found that by introducing a flexible portion such as an aromatic ether bond into the polyimide, a variety of characteristics of the battery can also follow the volume change of the active material, thereby completing the present invention.

Specifically, the present invention provides a binder resin for an electrode of a lithium secondary battery, the binder resin containing a solvent-soluble polyimide having a repeating unit represented by the following Formula [I].

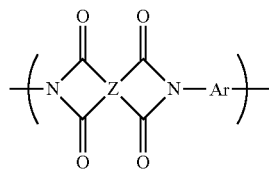

[I]

(In the formula, Z represents an aromatic or alicyclic tetracarboxylic dianhydride residue, and Ar is an aromatic diamine residue having a carboxyl group and an aromatic diamine residue having an aromatic ether bond, or an aromatic diamine residue having a phenylindan structure).

The present invention provides an electrode for a lithium secondary battery, which is formed by applying a mixture material of an active material, the binder resin of the present invention, and a conductive material onto a current collector.

The present invention also provides a lithium secondary battery comprising a negative electrode, a positive electrode, a separation membrane, an electrolyte, and an outer packaging material, wherein the positive electrode or the negative electrode is the above-described electrode of the present invention.

The present invention also provides a method of producing a binder resin for an electrode of a lithium secondary battery, comprising producing a solvent-soluble polyimide having a repeating unit represented by the following Formula [I] by dehydration condensation reaction of an aromatic or alicyclic tetracarboxylic dianhydride and an aromatic diamine having a carboxyl group and aromatic diamine having an aromatic ether bond, or dehydration condensation reaction of an aromatic or alicyclic tetracarboxylic dianhydride and an aromatic diamine having a phenylindan structure.

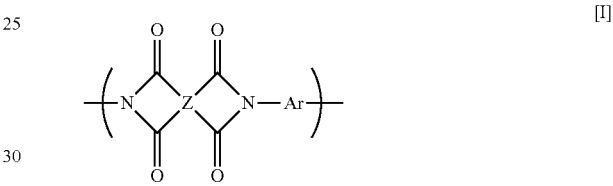

[I]

(In the formula, Z represents an aromatic or alicyclic tetracarboxylic dianhydride residue; and Ar is an aromatic diamine residue having a carboxyl group and an aromatic diamine residue having an aromatic ether bond, or an aromatic diamine residue having a phenylindan structure).

The present invention also provides a method of producing an electrode for a lithium secondary battery, comprising applying a mixture material containing an active material, a binder resin produced by the method of the present invention, and a conductive material onto a current collector, and drying the mixture material.

The present invention also provides a method of producing a lithium secondary battery using an electrode produced by the above-described method of the present invention.

Further, the present invention provides use of the above-described binder resin of the present invention as a binder resin for an electrode of a lithium secondary battery.

Effects of the Invention

When an electrode for a lithium secondary battery is produced using the binder resin for an electrode of the present invention, the binding strength between active material particles in a mixture material or between an active material particle and a current collector is remarkably increased. In addition, since it is not necessary to perform a heat treatment step after applying the mixture material to the current collector, the electrode can be easily produced. Further, a lithium secondary battery including the thus produced electrode has a high specific capacity, excellent charge/discharge efficiency and cycle characteristics, so that the output characteristics and life of the battery can be remarkably improved.

In particular, even when a material containing silicon (silicon) having a large change in volume at the occluding and releasing of lithium is used as a negative electrode active material, since collapse of a binder itself at the time of charge and discharge or occurrence of peeling at the interface between the active material and a current collector and the binder resin is suppressed, a lithium secondary battery excellent in rapid charge/discharge characteristics, charge/discharge cycle characteristics, active material coverage, charge/discharge efficiency, and safety can be provided.

MODE FOR CARRYING OUT THE INVENTION

Figure 1:
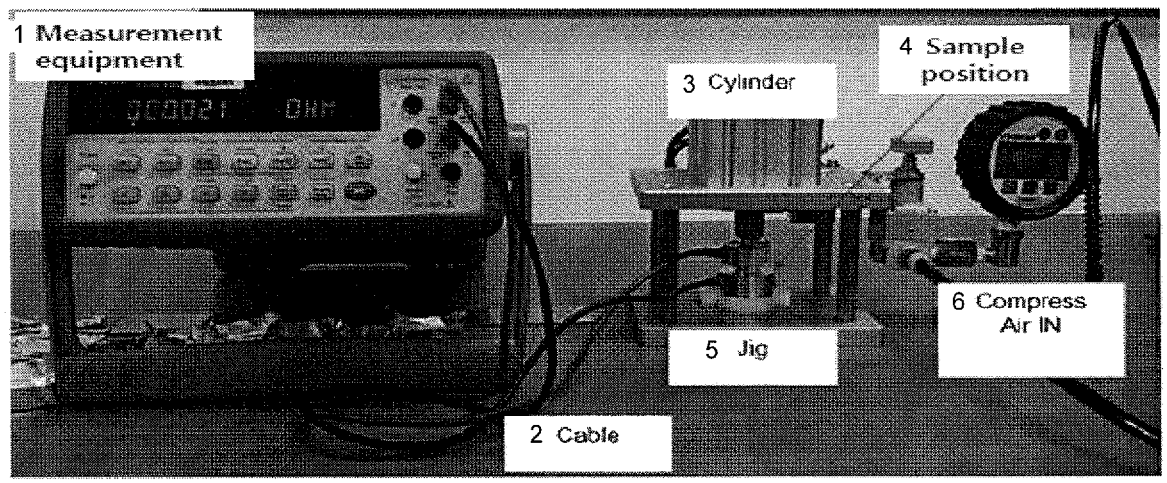
FIG. 1 is a view showing an apparatus for measuring the internal resistance of an electrode produced in Examples 1 to 9 and Comparative Examples 1 to 5 of the present invention.

The binder resin for an electrode of the lithium secondary battery of the present invention contains a solvent-soluble polyimide having a repeating unit represented by the following Formula (I).

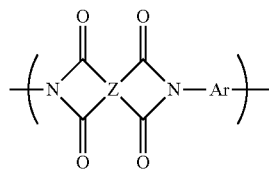
[I]

In the above-described Formula [I], Z represents an aromatic or alicyclic tetracarboxylic dianhydride residue; and Ar represents an aromatic diamine residue having a carboxyl group and an aromatic diamine residue having an aromatic ether bond, or an aromatic diamine residue having a phenylindan structure.

A polyimide contained in the electrode binder resin of the present invention is characterized by having at least one of the following structures (1) and (2).

(1) A structure having both a repeating unit in which Ar in the above-described Formula [I] is an aromatic diamine residue having a carboxyl group and a repeating unit in which Ar is an aromatic diamine residue having an aromatic ether bond (2) A structure having a repeating unit in which Ar in the above-described Formula [I] is an aromatic diamine residue having a phenylindan structure Since the polyimide structures (1) and (2) have a rigid structure portion which improves the adhesiveness between an active material, a current collector, and a conductive material, and a flexible portion which can follow the volume change during charging and discharging, the binding strength between the active material particles or between the active material particle and a metal current collector can be remarkably improved and the specific capacity, charge/discharge efficiency, and charge/discharge cycle characteristics of a battery can be improved.

For example, in the case of the structure (1), the aromatic ring moiety having a carboxyl group is a rigid structure moiety, and the aromatic ether bond moiety is a flexible moiety. A carboxyl group is preferable in that it has superior adhesive strength, resin stability, and moisture resistance as compared with other polar groups such as a hydroxyl group or an amino group.

In the case of the structure (2), the phenylindan structure is a rigid structure moiety that improves adhesiveness and imparts toughness, but the indan structure itself shown below has some flexibility.

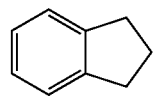

Therefore, a polyimide having the structure (2) may be a homopolymer as long as it contains a structure of a repeating unit in which Ar in the above-described Formula [I] is an aromatic diamine residue having a phenylindan structure, or it may be a block copolymer with a flexible structure, preferably a repeating unit containing an aromatic diamine residue having an aromatic ether bond. A polyimide containing a phenylindan structure is particularly preferable because it has excellent adhesive strength with copper, aluminum, silicon, titanium, and the like.

The polyimide having the above-described structure (1) is preferably a block copolymer having a repeating unit represented by the following Formula [II] and a repeating unit represented by the following Formula [III].

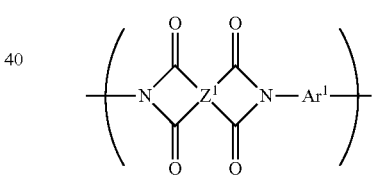
[II]

(In the formula, $Z^1$ represents an aromatic or alicyclic tetracarboxylic dianhydride residue, and $Ar^1$ is an aromatic diamine residue having a carboxyl group)

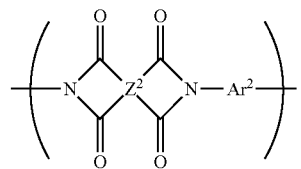
[III]

(In the formula, $Z^2$ represents an aromatic or alicyclic tetracarboxylic dianhydride residue and $Ar^2$ represents an aromatic diamine residue having an aromatic ether bond)

A solvent-soluble polyimide having a repeating unit represented by the Formula (I) can be obtained by dehydration condensation reaction of an aromatic or alicyclic tetracarboxylic dianhydride and an aromatic diamine having a carboxyl group and an aromatic diamine having an aromatic ether bond, or by subjecting an aromatic or alicyclic tetracarboxylic dianhydride and an aromatic diamine having a phenylindan structure to a dehydration condensation reaction.

Examples of the aromatic diamine having a carboxyl group (Ar$^1$ component) include 1,3-diaminobenzoic acid, 3,5-diaminobenzoic acid, 2,4-diaminophenylacetic acid, 2,5-diaminoterephthalic acid, 3,5-diaminoparatoluic acid, 3,5-diamino-2-naphthalenecarboxylic acid, 1,4-diamino-2-naphthalenecarboxylic acid, and 3,3'-dicarboxy-4,4'-diaminodiphenylmethane. Among these, monocarboxyl group-containing aromatic diamines having one carboxyl group are preferable.

Examples of the aromatic diamine having an aromatic ether bond (Ar$^2$ component) include 2,2-bis[4-(aminophenoxy)phenyl]propane, 1,1-bis[4-(4-aminophenoxy)phenyl]cyclohexane, 1,3-bis(3-aminophenoxy)benzene, 1,3-bis(4-aminophenoxy)benzene, 3-(3'-(3''-aminophenoxy)phenyl)amino-1-(3'-(3''-aminophenoxy)phenoxy)benzene, and 1,4-bis(4-aminophenoxy)benzene. Among them, an aromatic diamine having two aromatic ether bonds such as 1,3-bis(3-aminophenoxy)benzene, 1,3-bis(4-aminophenoxy)benzene, or 1,4-bis(4-aminophenoxy)benzene is preferable.

The aromatic diamine component having a carboxyl group (Ar$^1$ component) constituting a block copolymer having the structure (1) is preferably from 25% by mole to 60% by mole, more preferably from 27% by mole to 50% by mole of the total aromatic diamine component. When the aromatic diamine component having a carboxyl group (Ar$^1$ component) is less than 25% by mole, the adhesive strength between an active material, a conductive material, and a current collector is low, and when the ratio exceeds 60% by mole, the flexibility of a binder resin layer tends to decrease. The molar ratio (reaction ratio in dehydration condensation reaction) of an aromatic diamine component having a carboxyl group (Ar$^1$ component) in a block copolymer having the structure (1) to an aromatic diamine component having an aromatic ether bond (Ar$^2$ component) is preferably 1:0.6 to 3.0, more preferably 1:0.8 to 2.7, and still more preferably 1:1 to 2.5. In particular, the sum of (Ar$^1$ component) and (Ar$^2$ component) is preferably 100% by mole.

When a polyimide having the above-described structure (2) (phenylindan structure) is made into a block copolymer with another flexible repeating unit, a block copolymer containing a repeating unit represented by the following Formula [III] and a repeating unit represented by the following Formula [IV] is preferable.

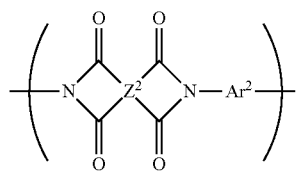

[III]

(In the formula, Z$^2$ represents an aromatic or alicyclic tetracarboxylic dianhydride residue and Ar$^2$ represents an aromatic diamine residue having an aromatic ether bond)

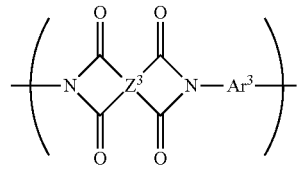

[IV]

(In the formula, Z$^3$ represents an aromatic or alicyclic tetracarboxylic dianhydride residue and Ar$^3$ is an aromatic diamine residue having a phenylindan structure)

The phenylindan structure is a structure in which a phenyl group which optionally has a substituent is substituted for the following indan skeleton, and examples of the substituent include a halogen atom or an alkyl group having 1 to 5 carbon atoms, preferably 1 to 3 carbon atoms. The aromatic diamine residue (Ar$^3$) containing a phenylindan structure is preferably a diamine residue containing a structure in which a phenyl group which optionally has a substituent at 1-position or 2-position of the following indan skeleton is substituted. Among others, diamine residues represented by the following Formula [V] are preferred.

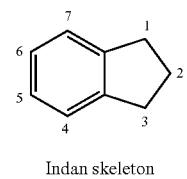

Indan skeleton

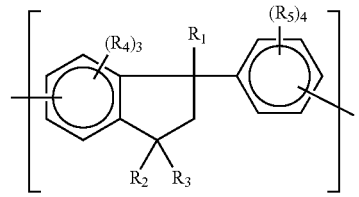

[V]

In the Formula [V], R$_1$, R$_2$, and R$_3$ each independently represent a hydrogen atom or an alkyl group having 1 to 5 carbon atoms, preferably an alkyl group having 1 to 3 carbon atoms. Each of R$_4$ and R$_5$ independently represents a hydrogen atom, a halogen atom, or an alkyl group having 1 to 5 carbon atoms, preferably an alkyl group having 1 to 3 carbon atoms.

Examples of the aromatic diamine containing a phenylindan structure (Ar$^3$ component) include 5-amino-1-(4'-aminophenyl)-1,3,3-trimethylindane, 6-amino-1-(4'-aminophenyl)-1,3,3-trimethylindane, 5-amino-6-methyl-1-(3'-amino-4'-methylphenyl)-1,3,3-trimethylindane, 5-amino-1-(4'-amino-Ph',Ph'-dichloro-phenyl)-Ph, Ph-dichloro-1,3,3-trimethylindane, 6-amino-1-(4'-amino-Ph',Ph'-dichlorophenyl)-Ph, Ph-dichloro-1,3,3-trimethylindane, 4-amino-6-methyl-1-(3'-amino-4'-methyl-phenyl)-1,3,3-trimethylindane, and Ph-amino-1-(Ph'-amino-2',4'-dimethylphenyl)-1,3,3,4,6-pentamethylindane. Ph and Ph' in the exemplified compounds represent unspecified positions in a phenyl ring in the phenylindan structure.

The aromatic diamine component having a phenylindan structure (Ar$^3$ component) constituting a block copolymerized polyimide having the above-described structure (2) (phenylindan structure) is preferably from 25% by mole to 90% by mole, more preferably from 27% by mole to 70% by mole of the total aromatic diamine component. When the aromatic diamine component having a phenylindan structure (Ar$^3$ component) is less than 25% by mole, the adhesive strength between the active material, the conductive material, and the current collector tends to be low. The molar ratio (reaction ratio in dehydration condensation reaction) of the aromatic diamine component having a phenylindan structure (Ar$^3$ component) in the block copolymer to an aromatic diamine component having an aromatic ether bond (Ar$^2$ component) is preferably 1:0.10 to 3.0, more preferably 1:0.13 to 2.8, and still more preferably 1:0.15 to 2.5. In particular, the sum of (Ar$^3$ component) and (Ar$^2$ component) is preferably 100 mol %.

The aromatic tetracarboxylic dianhydride for introducing the aromatic tetracarboxylic dianhydride residue represented by Z, Z$^1$ to Z$^3$ in the Formulae [1] to [IV] into polyimide is not particularly limited, and examples thereof include pyromellitic dianhydride, 3,4,3',4'-benzophenone tetracarboxylic dianhydride, 3,4,3',4'-diphenyl tetracarboxylic dianhydride, bis-(3,4-dicarboxyphenyl)ether dianhydride, 2,2-bis-(3,4-dicarboxyphenyl)hexafluoropropane dianhydride, and 4,4'-oxydiphthalic acid dianhydride.

Examples of the alicyclic tetracarboxylic dianhydride for introducing the alicyclic tetracarboxylic dianhydride residue represented by Z, Z$^1$ to Z$^3$ into the polyimide include bicyclo[2.2.2]oct-7-ene-2,3,5,6-tetracarboxylic dianhydride, norbornane-2-spiro-α-cycloalkanone-α'-spiro-2"-norbornane-5,5",6,6"-tetracarboxylic acid dianhydride, 1,2,3,4-cyclobutane tetracarboxylic acid dianhydride, 1,2,3,4-cyclopentane tetracarboxylic dianhydride, 1,2,4,5-cyclohexane tetracarboxylic dianhydride, 2,3,5-tricarboxycyclopentyl acetic acid dianhydride, 3,5,6-tricarboxynorbornane-2-acetic acid dianhydride, 2,3,4,5-tetrahydrofuran tetracarboxylic dianhydride, 1,3,3a,4,5,9b-hexahydro-5-(tetrahydro-2,5-dioxo-3-furanyl)-naphtho[1,2-c]-furan-1,3-dione, 1,3,3a,4,5,9b-hexahydro-5-methyl-5-(tetrahydro-2,5-dioxo-3-furanyl)-naphtho[1,2-c]-furan-1,3-dione, 1,3,3a,4,5,9b-hexahydro-8-methyl-5-(tetrahydro-2,5-dioxo-3-furanyl)-naphtho[1,2-c]-furan-1,3-dione, 5-(2,5-dioxotetrahydrofura)-3-methyl-3-cyclohexene-1,2-dicarboxylic acid dianhydride, bicyclo[2,2,2]-oct-7-ene-2,3,5,6-tetracarboxylic acid dianhydride, bicyclo[2,2,1]-heptane-2,3,5,6-tetracarboxylic dianhydride, and decahydrodimethanonaphthalene-2,3,6,7-tetracarboxylic dianhydride.

A method of synthesizing the solvent-soluble polyimide may be a known method, and is not particularly limited, and solvent-soluble polyimide can be synthesized by using substantially equal amounts of the above tetracarboxylic dianhydride and aromatic diamine and reacting in an organic polar solvent in the presence of a catalyst and a dehydrating agent at from 160 to 200° C. for several hours. N-methylpyrrolidone (NMP), γ-butyrolactone, N,N'-dimethylacetamide, N,N'-dimethylformamide, dimethylsulfoxide, tetramethylurea, tetrahydrothiophene-1,1-oxide, or the like is used as the organic polar solvent. The water produced by the imidization reaction is removed by azeotropic distillation with a dehydrating agent such as toluene, xylene, or tetrahydronaphthalene. As the catalyst, an acid or a base such as acetic anhydride/triethylamine, or γ-valerolactone/pyridine is used.

In the case of using a polyimide as a copolymer, a random copolymer is obtained by mixing a plurality of tetracarboxylic dianhydrides and an aromatic diamine at the same time and subjecting them to a condensation reaction. However, since this random polymer has drawbacks which depend on unfavorable properties, it is preferable to use a block copolymer as described above rather than a random copolymer. The block copolymer can be produced, for example, by a two-stage sequential addition reaction. In the first stage, a polyimide oligomer is synthesized from a tetracarboxylic dianhydride and an aromatic diamine, then the tetracarboxylic dianhydride and/or the aromatic diamine are further added in the second stage, and polycondensation is carried out to obtain a block copolymerized polyimide.

The term "solvent-soluble" in the present invention is a term used with respect to an organic polar solvent used in the synthesis of a polyimide and a solvent used in a mixture material described below, meaning a polyimide which dissolves in an amount of 5 g or more in 100 g of a solvent. The synthesized polyimide can be used as a binder resin, for example, in a state of being dissolved in the organic polar solvent or a solvent used in the mixture material described below so that the solid content is from 10% by weight to 30% by weight. An appropriate weight average molecular weight (Mw) of the solvent-soluble polyimide is preferably from 20,000 to 100,000, and an appropriate viscosity is from 2 to 10 Pa·s/25° C. when the solid content is from 20% by weight to 40% by weight. By optimizing conditions or the like of the copolymerization reaction and optimizing the molecular weight and viscosity of the polyimide within the above-described range, the active material coverage and the swelling resistance of an electrolytic solution of the binder resin containing the polyimide can be improved. The glass transition temperature (Tg) (based on TMA measurement method) of the solvent-soluble polyimide is preferably 200° C. or more because the safety is considerably improved as compared with PVDF (upper limit of commonly used temperature: 150° C.).

Some of such solvent-soluble polyimides are commercially available, and particularly preferable commercial products include Q-VR-X1413 (block copolymerized polyimide containing an aromatic diamine residue having a carboxyl group and an aromatic diamine residue having an aromatic ether bond) and Q-VR-X1415 (polyimide containing an aromatic diamine residue having a phenylindan structure) manufactured by PI R&D Co., Ltd.

By using a completely imidized solvent-soluble polyimide having the viscosity and molecular weight within the above-described appropriate range as a binder resin for an electrode, a step of coating a mixture material containing an active material, a conductive material, and a binder resin on both surfaces of a current collector is facilitated, and the production of the electrode is facilitated. Specifically, the film thickness uniformity of an electrode layer applied to a current collector is excellent, and voids are also less likely to occur.

Since a polyimide used as the binder resin of the present invention is a completely imidized polyimide, a heat treatment at a high temperature for imidization is not needed after a mixture material is applied to a current collector. Therefore, the binder resin of the present invention has an advantage that it is excellent in electrode manufacturability as compared with a polyamic acid (polyimide precursor) which demands a heat treatment at high temperature (300° C. or higher) for imidization after applying a mixture material to a current collector.

By using the specific binder resin of the present invention, an electrode of a lithium secondary battery can be produced. As electrodes of lithium secondary batteries, a positive electrode using a positive electrode active material having a high potential of 3 V or more with respect to the oxidation-reduction potential of lithium metal as an electrode active material and a negative electrode using a negative electrode active material having a low potential in the range of 0 to 2.0 V as an electrode active material are used.

The material used for the electrode and the method for forming the electrode layer are not particularly limited, known materials and methods used in the production of an electrode of a lithium secondary battery can be adopted. Specifically, an active material for a positive electrode or a negative electrode, the binder resin according to the present invention, a conductive material, and a solvent are mixed using a mixer and uniformly dispersed to prepare a slurry mixture material, and this mixture material is coated on both surfaces of a current collector made of aluminum or copper foil. Then, the solvent is dried, and the current collector is pressure-molded with a roll presser, and cut into a certain width, whereby a positive electrode or a negative electrode of a lithium secondary battery can be produced.

As the positive electrode active material, lithium-containing transition metal oxide or lithium-containing phosphate in powder form is preferable. Examples of the lithium-containing transition metal oxide include one selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, 0≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$, or a mixture of two or more kinds thereof. As the lithium-containing phosphate, a lithium-containing transition metal phosphate such as $Li_xCoPO_4$ (0.5<x<1.3) or $Li_xFePO_4$ (0.5<x<1.3) is preferable.

The surface of the lithium-containing transition metal oxide may be coated with a metal such as aluminum (Al) or a metal oxide. In addition to the lithium-containing transition metal oxide, a sulfide, a selenide, a halide, or the like may be used.

Examples of the negative electrode active material include one selected from a carbon material such as artificial graphite, natural graphite, hard carbon, or soft carbon and a non-carbon material such as a silicon-containing substance such as silicon (Si) or silicon alloy, tin (Sn), or lithium titanium oxide ($Li_4Ti_5O_{12}$) in powder form, or a mixture of two or more kinds thereof, but is not particularly limited thereto. In particular, it is preferable to use one selected from the group consisting of silicon-containing substance, graphite, and transition metal oxide powder, or a mixture of two or more kinds thereof or lithium titanium oxide, and in particular, a silicon-containing material is preferable.

The binder resin of the present invention can be used in the range of from 1% by weight to 30% by weight based on an electrode active material in terms of the weight (solid content) of the polyimide. In the case of a positive electrode, the amount of the binder resin (polyimide) used is preferably from 1% by weight to 10% by weight based on the positive electrode active material. When a carbon material is used as the active material of the negative electrode, the amount of the binder resin (polyimide) used is preferably from 1% by weight to 10% by weight based on the active material, and when a non-carbon material is used as the negative electrode active material, the amount is preferably from 3% by weight to 30% by weight. However, since the content of the binder resin can be variously designed depending on the specific surface area of the active material and the content of the conductive material, the amount is not limited to the above-described range.

The conductive material is not particularly limited as long as it is an electron conductive material which does not cause a chemical change in an electrochemical device. In general, conductive carbon powders such as carbon black, graphite, carbon nanotubes, and graphene can be used. At present, examples of products that are commercially available as conductive materials include acetylene black series (DENKA BLACK (registered trademark) manufactured by Denka Company Limited) (or manufactured by Gulf Oil Company, or the like), Ketjen Black EC series (manufactured by Armak Company), Vulcan XC-72 (manufactured by Cabot Company), and Super P (manufactured by MMM Company), and these can be used.

As the solvent used in a mixture material together with the active material, the binder resin, and the conductive material, the organic polar solvent used in synthesizing a polyimide in which the polyimide contained in the binder resin is soluble can be used.

The present invention also provides a lithium secondary battery using the negative electrode and the positive electrode produced as described above. The lithium secondary battery includes a negative electrode, a positive electrode, a separation membrane, an electrolyte, and an outer packaging material. Examples of the lithium secondary battery include a lithium metal secondary battery, a lithium ion secondary battery, a lithium polymer secondary battery, and a lithium ion polymer secondary battery.

As the separation membrane (separator), a commonly used porous polymer film, for example, a porous polymer film produced by a polyolefin polymer such as ethylene homopolymer, propylene homopolymer, ethylene/butene copolymer, ethylene/hexene copolymer and ethylene/methacrylate copolymer can be used singly or layering these films. A porous nonwoven fabric that is usually used, for example, a nonwoven fabric made of a high melting point glass fiber, polyethylene terephthalate fiber, or the like can be used, but is not limited thereto.

As the electrolyte, a nonaqueous electrolytic solution, a solid electrolyte, or a gel electrolyte can be used. As the nonaqueous electrolytic solution, a solution in which a salt represented by the formula: $A^+B^-$ is dissolved or dissociated in an organic solvent can be used, but is not limited thereto. Examples of the salt represented by the formula: $A^+B^-$ include a salt in which $A^+$ contains an alkali metal cation such as $Li^+$, $Na^+$, or $K^+$, or an ion composed of a combination thereof and $B^-$ contains an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, or $C(CF_2SO_2)_3^-$, or an ion composed of a combination thereof. Example of the organic solvent used for the nonaqueous electrolytic solution include an organic solvent composed of a mixture of propylene carbonate (PC), ethylene carbonate (EC), diethyl carbonate (DEC), dimethyl carbonate (DMC), ethyl methyl carbonate (EMC), fluoroethylene carbonate (FEC), dipropyl carbonate (DPC), γ-butyrolactone, and/or the like.

The outer packaging material may be a pouch shape formed by covering a multi-layer polymer resin on both sides of an aluminum foil or may be a can shape made of aluminum or steel, but is not limited thereto.

EXAMPLES

Hereinafter, the present invention will be described in detail based on Examples, but the present invention can be modified to a variety of other embodiments and is not limited to the following Examples.

1. Synthesis of Polyimide Binder Resin

Synthesis Example 1

A glass separable three-necked flask was fitted with a stirrer, a nitrogen inlet tube, and a condenser equipped with a water receptor. 58.84 g (0.2 mol) of 3,4,3',4'-biphenyltetracarboxylic acid dianhydride, 15.21 g (0.1 mol) of 1,3-diaminobenzoic acid (aromatic diamine having a carboxyl group; $Ar^1$ component in the Formula [II]), 1.5 g (0.015 mol) of valerolactone, 2.4 g (0.03 mol) of pyridine, 200 g of NMP, and 30 g of toluene were charged and stirred at room temperature under a nitrogen atmosphere at 200 rpm for 30 minutes, then heated to 180° C. and stirred for 1 hour with heating. After 15 ml of the azeotropic portion of toluene-water was removed and air-cooled, 46.53 g (0.15 mol) of 4,4'-oxydiphthalic acid dianhydride, 73.08 g (0.25 mol) of 1,3-bis(3-aminophenoxy)benzene (aromatic diamine having an aromatic ether bond; $Ar^2$ component in the Formula [III]), 360 g of NMP, and 90 g of toluene were added, the mixture was stirred at room temperature for 30 minutes, then heated to 180° C. and stirred for 1 hour with heating. After 45 ml of the azeotropic portion of water-toluene was removed, the reaction was terminated by heating and stirring at 180° C. for 2 hours and 30 minutes while removing the refluxed material out of the system. NMP was added to the obtained product and diluted to obtain a block copolymerized polyimide solution having a solid content of 20% by weight.

Synthesis Example 2

The same device as in Synthesis Example 1 was used. 58.84 g (0.2 mol) of 3,4,3',4'-biphenyltetracarboxylic acid dianhydride, 26.38 g (0.1 mol) of 5-amino-1-(4'-aminophenyl)-1,3,3-trimethylindane (aromatic diamine having a phenylindan structure; $Ar^3$ component in the Formula [IV]), 1.5 g (0.015 mol) of valerolactone, 2.4 g (0.03 mol) of pyridine, 200 g of NMP, and 30 g of toluene were charged and stirred at room temperature under a nitrogen atmosphere at 200 rpm for 30 minutes, then heated to 180° C. and stirred for 1 hour with heating. After 15 ml of the azeotropic portion of water-toluene was removed and air-cooled, 46.53 g (0.15 mol) of 4,4'-oxydiphthalic acid dianhydride, 73.08 g (0.25 mol) of 1,3-bis(3-aminophenoxy)benzene (aromatic diamine having an aromatic ether bond; $Ar^2$ component in the Formula [III]), 360 g of NMP, and 90 g of toluene were added, the mixture was stirred at room temperature for 30 minutes, then heated to 180° C. and stirred for 1 hour with heating. After 45 ml of the azeotropic portion of water-toluene was removed, the reaction was terminated by heating and stirring at 180° C. for 2 hours and 30 minutes while removing the refluxed material out of the system. NMP was added to the obtained product and diluted to obtain a block copolymerized polyimide solution having a solid content of 20% by weight.

Synthesis Comparative Example 1

The same device as in Synthesis Example 1 was used. 58.84 g (0.2 mol) of 3,4,3',4'-biphenyltetracarboxylic acid dianhydride, 10.81 g (0.1 mol) of m-phenylenediamine, 1.5 g (0.015 mol) of valerolactone, 2.4 g (0.03 mol) of pyridine, 200 g of NMP, and 30 g of toluene were charged and stirred at room temperature under a nitrogen atmosphere at 200 rpm for 30 minutes, then heated to 180° C. and stirred for 1 hour with heating. After 15 ml of the azeotropic portion of water-toluene was removed and air-cooled, 46.53 g (0.15 mol) of 4,4'-oxydiphthalic acid dianhydride, 73.08 g (0.25 mol) of 1,3-bis(3-aminophenoxy)benzene (aromatic diamine having an aromatic ether bond; $Ar^2$ component in the Formula [III]), 360 g of NMP, and 90 g of toluene were added, the mixture was stirred at room temperature for 30 minutes, then heated to 180° C. and stirred for 1 hour with heating. After 45 ml of the azeotropic portion of water-toluene was removed, the reaction was terminated by heating and stirring at 180° C. for 2 hours and 30 minutes while removing the refluxed material out of the system. NMP was added to the obtained product and diluted to obtain a block copolymerized polyimide solution having a solid content of 20% by weight.

Physical properties of the polyimide solutions obtained in Synthesis Examples 1 and 2 and Synthesis Comparative Example 1 are listed on the following Table 1 together with the physical properties of Q-VR-X1413 (block copolymerized polyimide containing an aromatic diamine residue having a carboxyl group and an aromatic diamine residue having an aromatic ether bond) and Q-VR-X1415 (polyimide containing an aromatic diamine residue having a phenylindan structure) manufactured by PI R&D Co., Ltd.

TABLE 1

| Binder Resin | Solid content (% by weight) | Solvent | Molecular weight (Mw) | Viscosity (Pa · s/25° C.) | Tg (° C./TMA) |
|---|---|---|---|---|---|
| Synthesis Example 1 | 20 | NMP | 80,000 | 5.8 | 230 |
| Synthesis Example 2 | 20 | NMP | 75,000 | 4.8 | 258 |
| Synthesis Comparative Example 1 | 20 | NMP | 80,000 | 7.0 | 240 |
| Q-VR-X1413 | 20 | NMP | 88,000 | 6.5 | 222 |
| Q-VR-X1415 | 35 | NMP | 58,000 | 2.1 | 265 |

2. Production of Electrode

Example 1

100 g of silicon powder having an average particle size of 0.2 μm as the negative electrode active material, 100 g of the polyimide solution produced in Synthesis Example 1 (polyimide solid content: 20 g) as the binder resin, 10 g of carbon black as the conductive material, and 100 g of NMP as the solvent were added to a mixer to produce a slurry (mixture material) uniformly dispersed and mixed. The obtained mixture material was applied to a copper foil current collector having a thickness of 10 μm at an area density of 3.5 mg/cm$^2$, the NMP solvent was dried, and then, the collector was rolled with a roll presser to prepare a negative electrode in which the initial thickness was reduced by 10%.

Example 2

A negative electrode was produced in the same manner as in Example 1 except that 100 g of the polyimide solution produced in Synthesis Example 2 (polyimide solid content: 20 g) was used as the binder resin in Example 1.

Example 3

A negative electrode was prepared in the same manner as in Example 1 except that the mass of the polyimide solution used in Example 1 was 75 g (polyimide solid content: 15 g).

Example 4

A negative electrode was prepared in the same manner as in Example 1 except that the mass of the polyimide solution used in Example 1 was 50 g (polyimide solid content: 10 g).

Example 5

A negative electrode was prepared in the same manner as in Example 1 except that 100 g (polyimide solid content: 20 g) of Q-VR-X1413 (a block copolymerized polyimide solution containing an aromatic diamine residue having a carboxyl group and an aromatic diamine residue having an aromatic ether bond) manufactured by PI R&D Co., Ltd. was used as the binder resin.

Example 6

A negative electrode was prepared in the same manner as in Example 1 except that 57 g (polyimide solid content: 20 g) of Q-VR-X1415 (a polyimide solution containing an aromatic diamine residue having a phenylindan structure) manufactured by PI R&D Co., Ltd. was used as the binder resin.

Comparative Example 1

A negative electrode was prepared in the same manner as in Example 1 except that as a binder resin, a polyamic acid having the following structure dissolved in NMP at a concentration of 20% by weight was used in place of the polyimide solution produced in Synthesis Example 1, the NMP solvent was dried, and then the heat treatment was performed at 350° C. for 2 hours to cause an imidization reaction on the current collector.

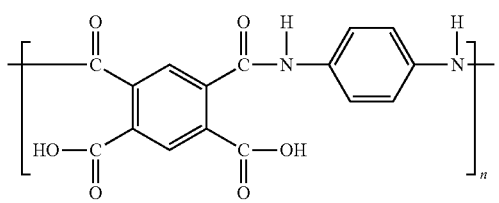

Comparative Example 2

A negative electrode was prepared in the same manner as in Example 1 except that 100 g of the polyimide solution produced in Synthesis Comparative Example 1 (polyimide solid content: 20 g) was used as the binder resin.

Example 7

100 g of artificial graphite powder having an average particle size of 8 μm as a negative electrode active material, 10 g of the polyimide solution produced in Synthesis Example 1 (polyimide solid content: 2 g) as a binder resin, and 100 g of NMP as a solvent were added to a mixer to produce a slurry (mixture material) uniformly dispersed and mixed. The obtained mixture material was applied to a copper foil current collector having a thickness of 10 μm at an area density of 10 mg/cm$^2$, the NMP solvent was dried, and then, the collector was rolled with a roll presser to prepare a negative electrode in which the initial thickness was reduced by 30%.

Comparative Example 3

A negative electrode was prepared in the same manner as in Example 7 except that 20 g of polyvinylidene fluoride (PVdF) dissolved in NMP at a concentration of 10% by weight was added as the binder resin.

Example 8

100 g of lithium nickel cobalt manganese oxide powder (LiNi$_{0.5}$Co$_{0.2}$Mn$_{0.3}$O$_2$) having an average particle size of 10 μm as a positive electrode active material, 4 g of carbon black as a conductive material, 15 g of the polyimide solution produced in Synthesis Example 1 (polyimide solid content: 3 g) as a binder resin, and 100 g of NMP as a solvent were added to a mixer to produce a slurry (mixture material) uniformly dispersed and mixed. The obtained mixture material was applied to an aluminum foil current collector having a thickness of 15 μm at an area density of 20 mg/cm$^2$, the NMP solvent was dried, and then, the collector was rolled with a roll presser to prepare a positive electrode in which the initial thickness was reduced by 40%.

Comparative Example 4

A positive electrode was prepared in the same manner as in Example 8 except that 30 g of polyvinylidene fluoride (PVdF) dissolved in NMP at a concentration of 10% by weight was added as the binder resin.

Example 9

A positive electrode was prepared in the same manner as in Example 8 except that lithium iron phosphate (LiFePO$_4$) powder having an average particle size of 5 μm was used as the positive electrode active material.

Comparative Example 5

A positive electrode was prepared in the same manner as in Example 9 except that 30 g of polyvinylidene fluoride (PVdF) dissolved in NMP at a concentration of 10% by weight was added as the binder resin.

3. Characterization of Electrode
(1) Measurement of Binding Strength of Electrode After adhering an adhesive tape having a width of 20 mm to the electrode, the binding strength (gf unit) between the tape and the electrode was measured using Tensile strength machine (manufactured by TESTONE Co., Ltd. (Korea), TO-100-1C).

(2) Measurement of Internal Resistance of Electrode

Figure 2:
FIG. 2 is a photograph showing a step of applying a mixture material containing a negative electrode active material (silicon), a binder resin (polyimide solution), a conductive material, and a solvent to a copper foil current collector in preparation of a negative electrode in Examples 1 to 6 of the present invention.
Figure 3:
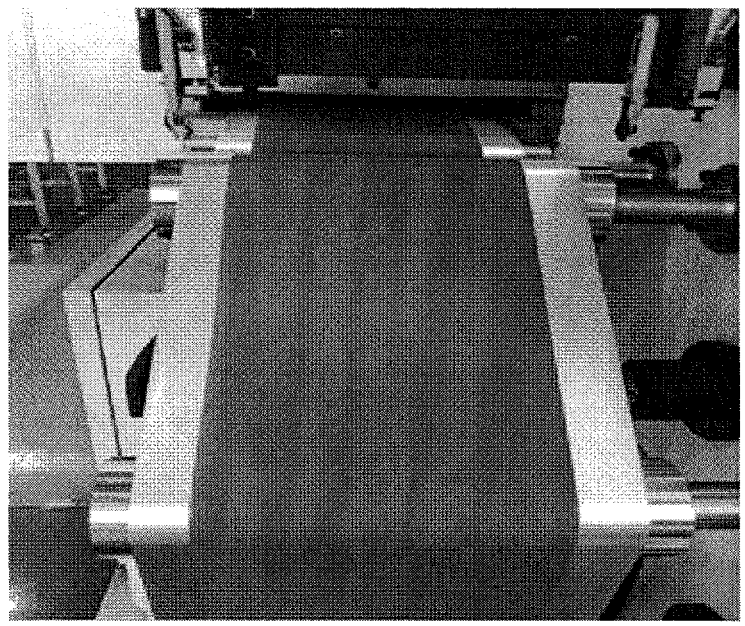
FIG. 3 is a photograph showing a state after drying a mixture material applied to a copper foil current collector in preparation of a negative electrode in Examples 1 to 6 of the present invention.

Electrodes manufactured in Examples and Comparative Examples were punched to a diameter of 10 mm to prepare measurement samples. A resistance measuring device (Multimeter 34401A manufactured by Agilent Technologies Japan, Ltd.) shown in FIG. 2 was prepared, and a sample was placed in an insertion opening at the center of a jig (Jig) and pressure bonded using a pneumatic cylinder at a pressure of 80 psi. Subsequently, a constant current was passed and the resistance (mΩ unit) was measured with a measuring machine.

The binding strength and the internal resistance of the electrodes produced in Examples 1 to 9 and Comparative Examples 1 to 5 were measured, and the results are listed on Table 2 below.

TABLE 2

| | Type of electrode | Type of binder resin/ Mass of polyimide solution (g) | Binding strength (gf) | Internal resistance (mΩ) |
|---|---|---|---|---|
| Example 1 | Silicon (Si) negative electrode | Synthesis Example 1/100 | 540 | 195 |
| Example 2 | Silicon (Si) negative electrode | Synthesis Example 2/100 | 420 | 238 |
| Example 3 | Silicon (Si) negative electrode | Synthesis Example 1/75 | 360 | 230 |
| Example 4 | Silicon (Si) negative electrode | Synthesis Example 1/50 | 290 | 226 |
| Example 5 | Silicon (Si) negative electrode | Q-VR-X1413*[1]/100 | 515 | 260 |
| Example 6 | Silicon (Si) negative electrode | Q-VR-X1415*[2]/57 | 406 | 248 |
| Comparative Example 1 | Silicon (Si) negative electrode | Polyamic acid/100 | 110 | 260 |
| Comparative Example 2 | Silicon (Si) negative electrode | Synthesis Comparative Example 1/100 | 190 | 270 |
| Example 7 | Graphite (C) negative electrode | Synthesis Example 1 | 140 | 10 |
| Comparative Example 3 | Graphite (C) negative electrode | PVdF | 65 | 12 |
| Example 8 | $LiNi_{0.5}Co_{0.2}Mn_{0.3}O_2$ positive electrode | Synthesis Example 1 | 493 | 3,624 |
| Comparative Example 4 | $LiNi_{0.5}Co_{0.2}Mn_{0.3}O_2$ positive electrode | PVdF | 92 | 3,571 |
| Example 9 | $LiFePO_4$ positive electrode | Synthesis Example 1 | 95 | 1,800 |
| Comparative Example 5 | $LiFePO_4$ positive electrode | PVdF | 25 | 1,930 |

*[1]Q-VR-X1413: Block copolymerized polyimide containing an aromatic diamine residue having a carboxyl group and an aromatic diamine residue having an aromatic ether bond
*[2]Q-VR-X1415: Polyimide containing an aromatic diamine residue having a phenylindan structure Comparing Examples 1 and 2 and Comparative Example 2 in which the masses of polyimide solutions were the same (the masses of the polyimide solid contents were also the same) in Table 2, it is understood that the silicon negative electrode (binding strength: 540 gf, internal resistance: 195 mΩ) of Example 1 using the polyimide of Synthesis Example 1 (having an aromatic diamine residue having a carboxyl group and an aromatic diamine residue having an aromatic ether bond) and the silicon negative electrode (binding strength: 420 gf, internal resistance: 238 mΩ) of Example 2 using the polyimide of Synthesis Example 2 (having an aromatic diamine residue having a phenylindan structure and an aromatic diamine residue having an aromatic ether bond) are remarkably improved in the binding strength as compared with the silicon negative electrode (binding strength: 190 gf, internal resistance: 270 mΩ) of Comparative Example 2 using the polyimide (having an aromatic ether bond-containing aromatic diamine residue but no carboxyl group-containing aromatic diamine residue or phenylindan structure-containing aromatic diamine residue) of Synthesis Comparative Example 1.

From the comparison of Examples 7 to 9 and Comparative Examples 3 to 5, it is understood that the binder resin of the present invention shows a remarkable improvement in binding strength as compared with PVdF even when the electrodes are a graphite negative electrode, a $LiNi_{0.5}Co_{0.2}Mn_{0.3}O_2$ positive electrode, and a $LiFePO_4$ positive electrode.

4. Production of Lithium Secondary Battery Coin Cell

Example 10

The silicon negative electrode produced in Example 1 was kept in a vacuum oven at 140° C. for 5 hours, and dried in such a manner that the moisture content in the electrode was less than 500 ppm, and a coin cell with a size of 2016 was produced by a usual method. Lithium was used as a counter electrode, a porous polyethylene film having a thickness of 20 μm was used as a separator, and an electrolytic solution in which 1.2 M concentration of lithium hexafluorophosphate ($LiPF_6$) was dissolved as a lithium salt in a solvent composed of ethylene carbonate (EC), diethyl carbonate (DEC), and ethyl methyl carbonate (EMC) in a volume ratio of 3:3:4 was used as an electrolyte.

Example 11

A coin cell was produced in the same manner as in Example 10 except that the silicon negative electrode produced in Example 2 was used as the negative electrode.

Example 12

A coin cell was produced in the same manner as in Example 10 except that the silicon negative electrode produced in Example 3 was used as the negative electrode.

Example 13

A coin cell was produced in the same manner as in Example 10 except that the silicon negative electrode produced in Example 4 was used as the negative electrode.

Example 14

A coin cell was produced in the same manner as in Example 10 except that the silicon negative electrode produced in Example 5 was used as the negative electrode.

Example 15

A coin cell was produced in the same manner as in Example 10 except that the silicon negative electrode produced in Example 6 was used as the negative electrode.

Comparative Example 6

A coin cell was produced in the same manner as in Example 10 except that the silicon negative electrode produced in Comparative Example 1 was used as the negative electrode.

Comparative Example 7

A coin cell was produced in the same manner as in Example 10 except that the silicon negative electrode produced in Comparative Example 2 was used as the negative electrode.

Example 16

A coin cell was produced in the same manner as in Example 10 except that the graphite negative electrode produced in Example 7 was used as the negative electrode.

Example 17

A coin cell was produced in the same manner as in Example 10 except that the positive electrode (lithium nickel cobalt manganese oxide) produced in Example 8 was used as the positive electrode.

Example 18

A coin cell was produced in the same manner as in Example 10 except that the positive electrode (lithium iron phosphate) produced in Example 9 was used as the positive electrode.

5. Characterization of Coin Cell (1) Measure of Specific Capacity (mAh/g)

For the negative electrode, charging was carried out at a constant current charging rate of 0.1 C at room temperature up to an end voltage of 0.05 V, and discharging was carried out at a constant current discharging rate of 0.1 C at room temperature up to 1.5 V. For the positive electrode, charging was performed at a charging rate of 0.1 C at room temperature up to a final voltage of 4.2 V, and discharging was performed at a discharging rate of 0.1 C at room temperature up to 3.0 V. The specific capacity was determined by calculating the amount (g) of an active material in an electrode used in producing a coin cell and dividing the measured discharge capacity (mAh) by the amount (g) of the active material.

(2) Measurement of Charge/Discharge Efficiency (%)

The charge/discharge efficiency was calculated by the following equation using the initial charge capacity and the discharge capacity measured in the above-described (1).

$$\text{Charge/discharge efficiency (\%)} = (\text{discharge capacity (mAh)}/\text{charge capacity (mAh)}) \times 100$$

(3) Measurement of Cycle Characteristics

For the negative electrode, charging was carried out at a constant current charging rate of 1.0 C at room temperature up to an end voltage of 0.05 V, and discharging was carried out at a constant current discharging rate of 1.0 C at room temperature up to 1.5 V. For the positive electrode, charging was performed at a charging rate of 1.0 C at room temperature up to a final voltage of 4.2 V, and discharging was performed at a discharging rate of 1.0 C at room temperature up to 3.0 V. Cycle characteristics were calculated by the following equation by repeating charging and discharging under the same conditions, measuring the initial discharge capacity and the 50th discharge capacity.

$$\text{Cycle characteristics (\%)} = [(\text{50th discharge capacity (mAh)})/(\text{initial discharge capacity(mAh)})] \times 100$$

The specific capacity, charge/discharge efficiency and cycle characteristics of the coin cells produced in Examples 10 to 18 and Comparative Examples 6 and 7 were measured, and the results are listed on the Table 3 below.

TABLE 3

| | Type of electrode | Binder resin/ Mass of polyimide solution (g) | Specific capacity (mAh/g) | Charge and discharge efficiency (%) | Cycle characteristics (%) |
|---|---|---|---|---|---|
| Example 10 | Silicon (Si) negative electrode (Example 1) | Synthesis Example 1/ 100 | 3,360 | 89.1 | 86 |
| Example 11 | Silicon (Si) negative electrode (Example 2) | Synthesis Example 2/ 100 | 3,250 | 88.2 | 81 |
| Example 12 | Silicon (Si) negative electrode (Example 3) | Synthesis Example 1/75 | 3,122 | 86.4 | 76 |
| Example 13 | Silicon (Si) negative electrode (Example 4) | Synthesis Example 1/50 | 2,773 | 83.5 | 72 |

TABLE 3-continued

|  | Type of electrode | Binder resin/ Mass of polyimide solution (g) | Specific capacity (mAh/g) | Charge and discharge efficiency (%) | Cycle characteristics (%) |
|---|---|---|---|---|---|
| Example 14 | Silicon (Si) negative electrode (Example 5) | Q-VR-X1413/ 100 | 3,329 | 88.9 | 82 |
| Example 15 | Silicon (Si) negative electrode (Example 6) | Q-VR-X1415/ 57 | 3,210 | 87.5 | 78 |
| Comparative Example 6 | Silicon (Si) negative electrode (Comparative Example 1) | Polyamic acid/ 100 | 2,560 | 78.3 | 65 |
| Comparative Example 7 | Silicon (Si) negative electrode (Comparative Example 2) | Synthesis Comparative Example 1/ 100 | 2,930 | 85.4 | 68 |
| Example 16 | Graphite (C) negative electrode (Example 7) | Synthesis Example 1 | 325.6 | 93.5 | 88 |
| Example 17 | $LiNi_{0.5}Co_{0.2}Mn_{0.3}O_2$ positive electrode (Example 8) | Synthesis Example 1 | 164.5 | 96.2 | 87 |
| Example 18 | $LiFePO_4$ positive electrode (Example 9) | Synthesis Example 1 | 147.2 | 96.3 | 93 |

Comparing the coin cells of Examples 10 and 11 and the coin cell of Comparative Example 7 in which the masses of polyimide solutions used for preparing the electrodes were the same (the masses of the polyimide solid contents were also the same) in Table 3, it is understood that the coin cell of Example 10 using the polyimide of Synthesis Example 1 (having an aromatic diamine residue having a carboxyl group and an aromatic diamine residue having an aromatic ether bond) and the coin cell of Example 11 using the polyimide of Synthesis Example 2 (having an aromatic diamine residue having a phenylindan structure and an aromatic diamine residue having an aromatic ether bond) are remarkably improved in the specific capacity, the charge/discharge efficiency, and the cycle characteristics as compared with the coin cell of Comparative Example 7 using the polyimide (having an aromatic ether bond-containing aromatic diamine residue but no carboxyl group-containing aromatic diamine residue or phenylindan structure-containing aromatic diamine residue) of Synthesis Comparative Example 1.

From the comparison of Examples 16 to 18, it is understood that a lithium secondary battery including an electrode produced by using the binder resin of the present invention shows a favorable specific capacity, charge/discharge efficiency, and cycle characteristics even when the electrodes are a graphite negative electrode, a $LiNi_{0.5}Co_{0.2}Mn_{0.3}O_2$ positive electrode, and a $LiFePO_4$ positive electrode.

Industrial Applicability

When an electrode for a lithium secondary battery is produced using the binder resin for an electrode of the present invention, the binding strength between active material particles in a mixture material or between an active material particle and a current collector is remarkably increased, whereby the electrode can be easily produced. Further, a lithium secondary battery including the thus produced electrode has a high specific capacity, excellent charge/discharge efficiency and cycle characteristics.

In particular, even when a material containing silicon (silicon) is used as a negative electrode active material, a lithium secondary battery excellent in rapid charge/discharge characteristics, charge/discharge cycle characteristics, active material coverage, charge/discharge efficiency, and safety can be provided.

DESCRIPTION OF SYMBOLS

1 Measuring machine
2 Cable
3 Cylinder
4 Sample position
5 Jig
6 Compression air inlet

The invention claimed is:
1. An electrode for a lithium secondary battery, which is formed by applying a mixture material of an active material, a binder resin for an electrode of a lithium secondary battery, said binder resin containing a solvent-soluble polyimide having a repeating unit represented by the following Formula [I]:

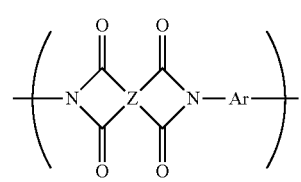

[I]

wherein in the formula, Z represents an aromatic or alicyclic tetracarboxylic dianhydride residue; and Ar is an aromatic diamine residue having a carboxyl group and an aromatic diamine residue having an aromatic ether bond, or an aromatic diamine residue having a phenylindan-structure, and a conductive material onto a current collector, wherein the electrode is a negative electrode using a silicon-containing substance as the active material, wherein in cases where Ar is the aromatic diamine residue having a carboxyl group and the aromatic diamine residue having an aromatic ether bond, the aromatic diamine component having a carboxyl group is from 27% by mole to 50% by mole of a total aromatic diamine component, wherein the content of the binder resin based on the active material is from 10% by weight to 30% by weight in terms of the weight (solid content) of the polyimide, and wherein the silicon-containing substance is silicon (Si) or silicon alloy.

2. The electrode according to claim 1, wherein the content of the binder resin based on the active material is from 15% by weight to 30% by weight in terms of the weight (solid content) of the polyimide.

3. A lithium secondary battery comprising a negative electrode, a positive electrode, a separation membrane, an electrolyte, and an outer packaging material, wherein the positive electrode or the negative electrode is the electrode according to claim 1.

4. The electrode according to claim 1, wherein the solvent-soluble polyimide is a block copolymer having a repeating unit represented by the following Formula [II] and a repeating unit represented by the following Formula [III]:

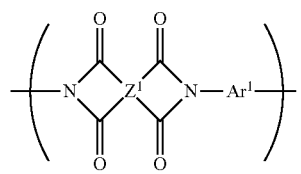

[II]

wherein in the formula, $Z^1$ represents an aromatic or alicyclic tetracarboxylic dianhydride residue, and $Ar^1$ is an aromatic diamine residue having a carboxyl group

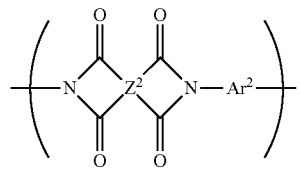

[III]

wherein in the formula, $Z^2$ represents an aromatic or alicyclic tetracarboxylic dianhydride residue and $Ar^2$ represents an aromatic diamine residue having an aromatic ether bond.

5. The electrode according to claim 1, said binder resin containing a solvent-soluble polyimide having a repeating unit represented by the following Formula [IV]:

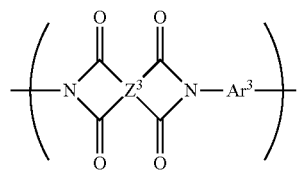

[IV]

wherein in the formula, $Z^3$ represents an aromatic or alicyclic tetracarboxylic dianhydride residue and $Ar^3$ is an aromatic diamine residue having a phenylindan structure.

6. The electrode according to claim 5, wherein the solvent-soluble polyimide is a block copolymer comprising a repeating unit represented by the following Formula [III] and a repeating unit represented by the following Formula [IV]:

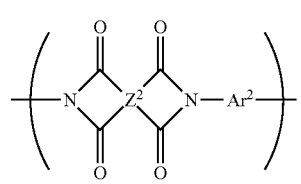

[III]

wherein in the formula, $Z^2$ represents an aromatic or alicyclic tetracarboxylic dianhydride residue and $Ar^2$ represents an aromatic diamine residue having an aromatic ether bond:

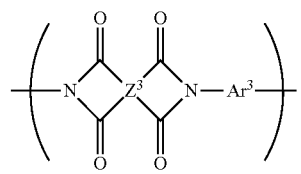

[IV]

wherein in the formula, $Z^3$ represents an aromatic or alicyclic tetracarboxylic dianhydride residue and $Ar^3$ is an aromatic diamine residue having a phenylindan structure.

7. The electrode according to claim 6, wherein the aromatic diamine component having a phenylindan structure constituting the solvent-soluble polyimide is from 25% by mole to 90% by mole of the total aromatic diamine component.

8. The electrode according to claim 1, wherein Z is the aromatic tetracarboxylic dianhydride residue, and the aromatic tetracarboxylic dianhydride for introducing the aromatic tetracarboxylic dianhydride residue is 3,4,3',4'-biphenyltetracarboxylic acid dianhydride and 4,4'-oxydiphthalic acid dianhydride.

9. The electrode according to claim 1, wherein the sum of the aromatic diamine component having a carboxyl group and the aromatic diamine component having an aromatic ether bond is 100% by mole among the diamine components.

* * * * *